Aug. 25, 1925.

1,551,342

C. STEENSTRUP
METHOD OF MANUFACTURING TURBINE WHEELS, NOZZLE DIAPHRAGMS, AND THE LIKE
Filed Feb. 25, 1924

Inventor:
Christian Steenstrup,
by *Alexander S. Lunt*
His Attorney.

Patented Aug. 25, 1925.

1,551,342

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

METHOD OF MANUFACTURING TURBINE WHEELS, NOZZLE DIAPHRAGMS, AND THE LIKE.

Application filed February 25, 1924. Serial No. 695,133.

*To all whom it may concern:*

Be it known that I, CHRISTIAN STEEN-STRUP, a citizen of the United States, residing at Schenectady, county of Schenectady, State of New York, have invented certain new and useful Improvements in Methods of Manufacturing Turbine Wheels, Nozzle Diaphragms, and the like, of which the following is a specification.

The present invention relates to the manufacture of articles comprising a plurality of partition members arranged and held between two holding members and is particularly applicable to the manufacture of turbine wheels and turbine diaphragms, although it is not necessarily limited thereto.

The object of the invention is to provide an improved method whereby such articles can be manufactured at a low cost but at the same time with a high degree of accuracy, and for a consideration of what I believe to be novel and my invention, attention is directed to the accompanying description and the claims appended thereto.

Figure 1:
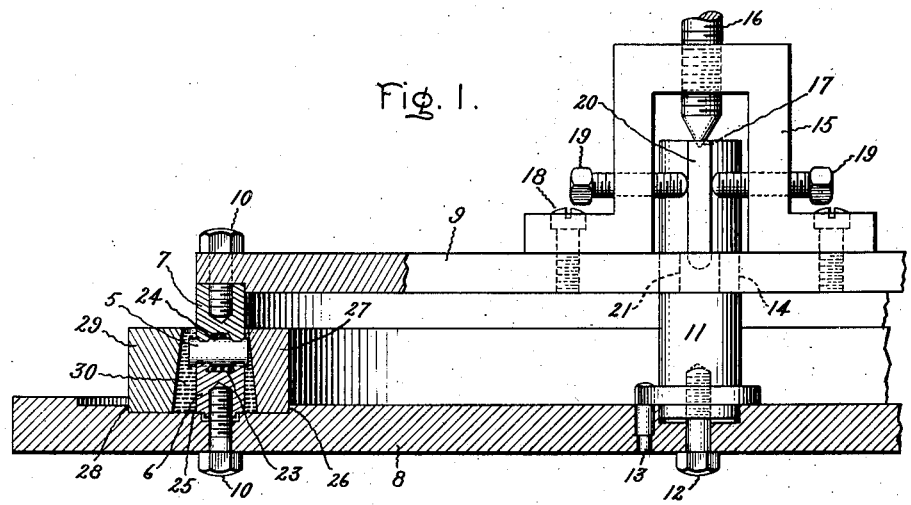
Figure 3:
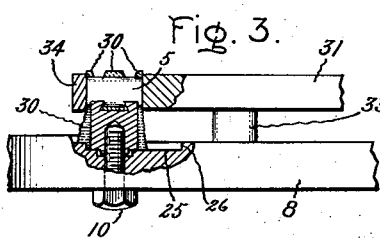
Figure 2:
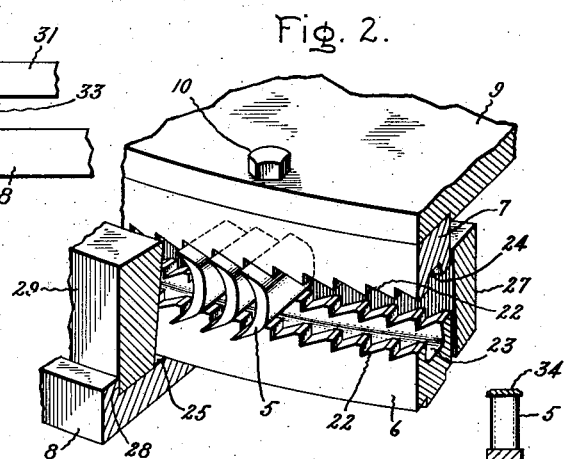
Figure 4:
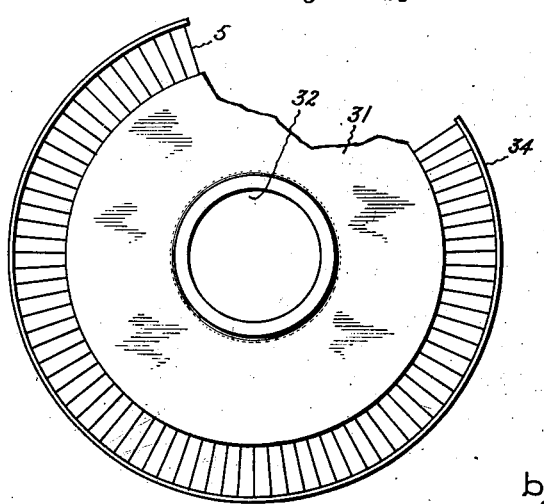
Figure 5:
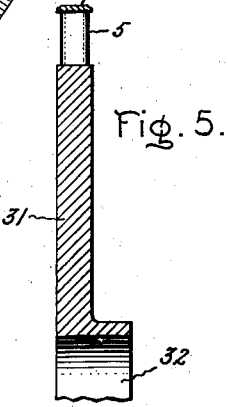

In the drawing, wherein I have illustrated my method applied to the manufacture of a turbine wheel, Fig. 1 is a side view, partly in section illustrating certain steps of the method, and apparatus which may be used in carrying them out; Fig. 2 is a detail perspective view of certain of the parts shown in Fig. 1; Fig. 3 is a detail view illustrating certain additional steps; Fig. 4 is a side view partly broken away of a completed turbine element made in accordance with my invention, and Fig. 5 is a radial sectional view of the wheel shown in Fig. 4.

In carrying out my invention, in connection with the manufacture of a turbine wheel, I provide turbine buckets 5 of suitable length and section. The buckets may have perfectly smooth ends and hence may be cut from strips of blade stock of the desired cross section which strips may be made by drawing the strip material through suitable dies. This means that the buckets may be manufactured at a low cost.

I then assemble the buckets in correct relation to each other which may be done by mounting them edgewise between two spaced holders 6 and 7, leaving the ends of the buckets free and projecting slightly beyond the side walls of the holders. This may be accomplished conveniently by providing a base plate 8 which carries the lower holder 6 and a top plate 9 which carries the upper holder 7. Holders 6 and 7 may be formed integral with plates 8 and 9 or they may be formed separately and attached to the plates by bolts 10 as shown in the drawing. At the center of base plate 8 is a post 11 fastened in position by a stud 12 and dowel pin 13 and in top plate 9 is an opening 14 through which post 11 projects. Post 11 serves to center the top plate and also to support it in spaced relation to the base plate, the top plate being provided with a yoke 15 which carries a pivot screw 16 resting in a bearing recess 17 in the top of the post. Yoke 15 is attached to top plate 9 by screws 18 and is sufficiently wide to straddle post 11. On one side yoke 15 projects beyond the confines of post 11 and is provided with two set screws 19 which engage opposite sides of a lug 20 projecting from the side of post 11. At the edge of opening 14 is a slot 21 somewhat wider than lug 20 and through which the lug passes. It will be seen that by adjusting pivot screw 16 plates 8 and 9 may be moved toward and away from each other and that by adjusting set screws 19 the plates may be adjusted circumferentially relatively to each other. Slot 21 is a sufficient amount wider than lug 20 to permit of the maximum circumferential adjustment required.

The opposing surfaces of holding members 6 and 7 are provided with spaced transverse grooves or recesses 22 of a shape suitable for receiving the edges of buckets 5, the spacing being such as to give the desired pitch to the buckets. Also in such opposing surfaces are circumferential grooves of suitable width and depth, the groove 23 in the lower holding member being undercut and the groove 24 in the upper holding member being tapered outwardly. In the base plate 8 is an annular recess 25 which provides an inner shoulder 26 for centering an inner ring 27 and an outer shoulder 28 for centering an outer ring 29. The outer surface of ring 27 and the inner surface of ring 29 are beveled as shown in Fig. 1 so that the spaces between them tapers inwardly from the bottom toward the top.

In assembling the buckets in this form or fixture, ring 27 is positioned on base plate 8 after which top plate 9 is put in position and adjusted by means of pivot screw 16 and set screws 19 to bring transverse grooves 22 into correct relation to each other. Buckets 5 are then inserted edgewise into grooves 22 after the manner indicated in Fig. 2. At this time top plate 9 may be raised a little so as to permit of the buckets being readily put into position. Inner ring 27 serves as a stop for positioning the buckets radially. After all the buckets are in place top plate 9 may be finally adjusted circumferentially to bring the buckets to the correct relative angular position and also adjusted downward to rest on the upper edges of the buckets so they are firmly held between the two plates. Following this ring 29 is put into position after which all the spaces between rings 27 and 29 are filled with a substance or material which may be applied in liquid form and will then harden and which is readily removable. Preferably I use a metal which is solid at ordinary atmospheric temperatures and melts at a temperature lower than the temperature of boiling water. For example, I have found alloys of bismuth, lead and tin, or of bismuth, lead, tin and cadmium, which alloys are ordinarily known as "fusible metals" satisfactory. A fusible metal which melts at a temperature of about 90° C. is satisfactory. The fusible metal is melted and poured between rings 27 and 29. It fills the spaces between the buckets, the grooves 23 and 24 and the spaces at the ends of the buckets. The metal is indicated at 30 in Figs. 1 and 3.

After the metal has hardened I remove top plate 9 and holder member 7, the latter being readily removable because of the taper of groove 24, and following this I remove post 11 and rings 27 and 29, these latter being readily removable also by reason of their tapered construction. This then leaves the buckets held by the fusible metal in correct relation to each other and attached to base plate 8. After rings 27 and 29 have been removed, base plate 8 is placed in a lathe and the fusible metal and bucket ends are machined to bring them to the desired internal and external diameter. The internal diameter is finished so that the web of the wheel will fit within the ring of buckets and the outside diameter is finished just slightly larger than the bucket cover ring. I need finish the structure only adjacent the bucket ends.

I now position the disk which is to form the web of the wheel within the bucket ring supporting it in place in any suitable manner. In Fig. 3, 31 indicates the disk which forms the web. It may be formed of ordinary flat plate material and is provided at its center with a flanged opening 32 (Figs. 4 and 5) which receives the shaft. Its periphery is finished to dimensions to fit nicely inside the bucket ring. In the present instance disk 31 is supported in position on a suitable number of blocks 33, three for example, as shown in Fig. 3, the blocks resting on base 8.

I next take the ring which is to form the bucket cover, heat it, and shrink it into position around the bucket ring. This ring is indicated at 34 in Fig. 3 and is of suitable thickness to form the bucket cover and to be readily handled when being heated and placed around the buckets. The ring may be made so that it is slightly smaller in internal diameter then the external diameter of the bucket ring. After ring 34 has been shrunk into position the buckets are gripped tightly between it and disk 31.

The fusible metal is now melted out from between the buckets. This may be done by immersing the structure in a bath of water of suitable temperature. This removes all the fusible metal and frees the wheel from base 8, leaving a wheel structure comprising the buckets 5 properly spaced and held between disk 31 and ring 34, the structure being now united in what may be termed an initial manner.

I now permanently unite the strucure comprising disk 31, buckets 5 and ring 34 by fusion of metal, as by welding, brazing, soldering or the like. Any suitable method of uniting by fusion of metal may be employed but preferably I employ the method disclosed in my application Ser. No. 354,014, filed January 26, 1920. This method comprises placing the assembled structure in a suitable muffler containing a reducing atmosphere such as hydrogen, an alloying metal such as copper having been previously placed adjacent the joint between the parts to be heated. When heated to a suitable temperature the copper enters the interstices between the parts and unites them to each other to form in substance an integral structure. However, my invention is not necessarily limited to this specific method of permanently uniting the parts and it is to be understood that by the term "fusion of metal" I mean the particular method referred to or other suitable method.

For performing the brazing operation, I may with advantage use a closed furnace of the type illustrated and described in my application, Ser. No. 681,864, filed December 20, 1923.

After the structure has been united by fusion of metal, it may be then finished to the desired dimensions and the bucket cover turned down to the desired thickness. Figs. 4 and 5 illustrate a finished turbine wheel.

The application of my method to the manufacture of diaphragms for turbines and other similar structures will be readily understood from the foregoing description. In the case of turbine diaphragms, fluid-directing elements in the form of nozzle partitions will replace the fluid-directing elements in the form of the buckets 5 in the structure described.

It will be seen that by the use of my invention, I am enabled to use fluid-directing elements, that is turbine buckets, nozzle partitions, or the like which require no special shape or finishing on the ends and that likewise I can utilize webs and outer rings requiring no specially shaped finishing. This very materially reduces the cost of manufacturing. At the same time however, a strong and accurately dimensioned product results.

In accordance with the provisions of the patent statutes, I have described the principle of operation of my invention, together with the particular method which I now consider to represent the best manner for carrying it out but I desire to have it understood that the particular method disclosed is only illustrative and that the invention may be carried out with such modifications as come within the scope of the appended claims.

What I claim as new and desire to secure by Letters Patent of the United States, is,—

1. The method of manufacturing a structure comprising a number of elements attached to a carrying member, which comprises assembling the elements in the desired relation to each other and while held in such relation flowing a substance around them which will harden to maintain them in such relation and which is afterwards readily removable, fastening the assembled elements while held by the hard substance to the carrying member, and then removing the hard substance.

2. The method of manufacturing a structure comprising a number of elements attached to a carrying member which comprises assembling the elements in the desired relation to each other and while held in such relation flowing a readily fusible substance around them to maintain them in such relation, fastening the assembled elements to the carrying member, and then melting out the fusible substance.

3. The method of manufacturing a structure comprising a number of elements attached to a carrying member which comprises assembling the elements in the desired relation to each other and while held in such relation flowing a substance around them which will harden to maintain them in such relation and which is afterwards readily removable, finishing the elements to required dimensions while held by the readily removable substance, fastening the assembled elements to the carrying member, and then removing the substance.

4. The method of manufacturing a structure comprising a number of elements attached to a carrying member which comprises assembling the elements in the desired relation to each other and while held in such relation flowing a substance around them which will harden to maintain them in such relation and which is afterwards readily removable, finishing the elements to required dimensions while held by the hard substance, fastening the assembled elements to the carrying member in an initial manner, removing the hard substance, and then permanently uniting the elements and carrying member by fusion of metal.

5. The method of manufacturing a structure comprising a number of elements attached to a carrying member, which comprises assembling the elements in a form in the desired relation to each other and while held in such form flowing a readily removable substance around the elements which will harden to hold them in such relation, and then attaching the elements to the carrying member and removing the substance.

6. The method of manufacturing a structure comprising a plurality of elements held between two members which comprises assembling the elements in the desired relation to each other, and while held in such relation flowing a readily removable substance around them which will harden to maintain them in such relation, then fastening the elements between the two members, and removing the substance.

7. The method of manufacturing a structure comprising a plurality of elements held between two members which comprises assembling the elements in the desired relation to each other, and while held in such relation flowing a readily removable substance around them which will harden to maintain them in such relation, fastening the elements between the two members in an initial manner, removing the substance, and then permanently uniting the elements and members by fusion of metal.

8. The method of manufacturing a turbine structure comprising a plurality of fluid-directing elements and a carrying member to which they are attached, which comprises assembling the fluid-directing elements in correct relation to each other and while held in such relation flowing such a fusible metal substance around them which will harden to maintain them in such relation and which is readily removable, finishing the ends of the elements to the desired dimensions, mounting them on the carrying member, and then removing the substance.

9. The method of manufacturing a turbine structure comprising a plurality of fluid-directing elements held between two annular carrying members which comprises assembling the fluid-directing elements in a form in correct relation to each other and while held in such relation flowing a substance around them which will harden to hold them in such relation, finishing the ends of the fluid-directing elements to form a ring of the desired size, mounting such ring between the annular carrying members and attaching it thereto, and then removing the substance.

10. The method of manufacturing a turbine structure comprising a plurality of fluid-directing elements held between two annular carrying members which comprises assembling the fluid-directing elements in a form in correct relation to each other and while held in such relation flowing a readily removable substance around them which will harden to hold them in such relation, finishing the ends of the fluid-directing elements to form a ring of the desired size, mounting such ring between the annular carrying members by placing the ring around the inner member and shrinking the outer member around it, removing the substance, and then uniting the structure by fusion of metal.

In witness whereof, I have hereunto set my hand this 21st day of February, 1924.

CHRISTIAN STEENSTRUP.